No. 758,726. Patented May 3, 1904.

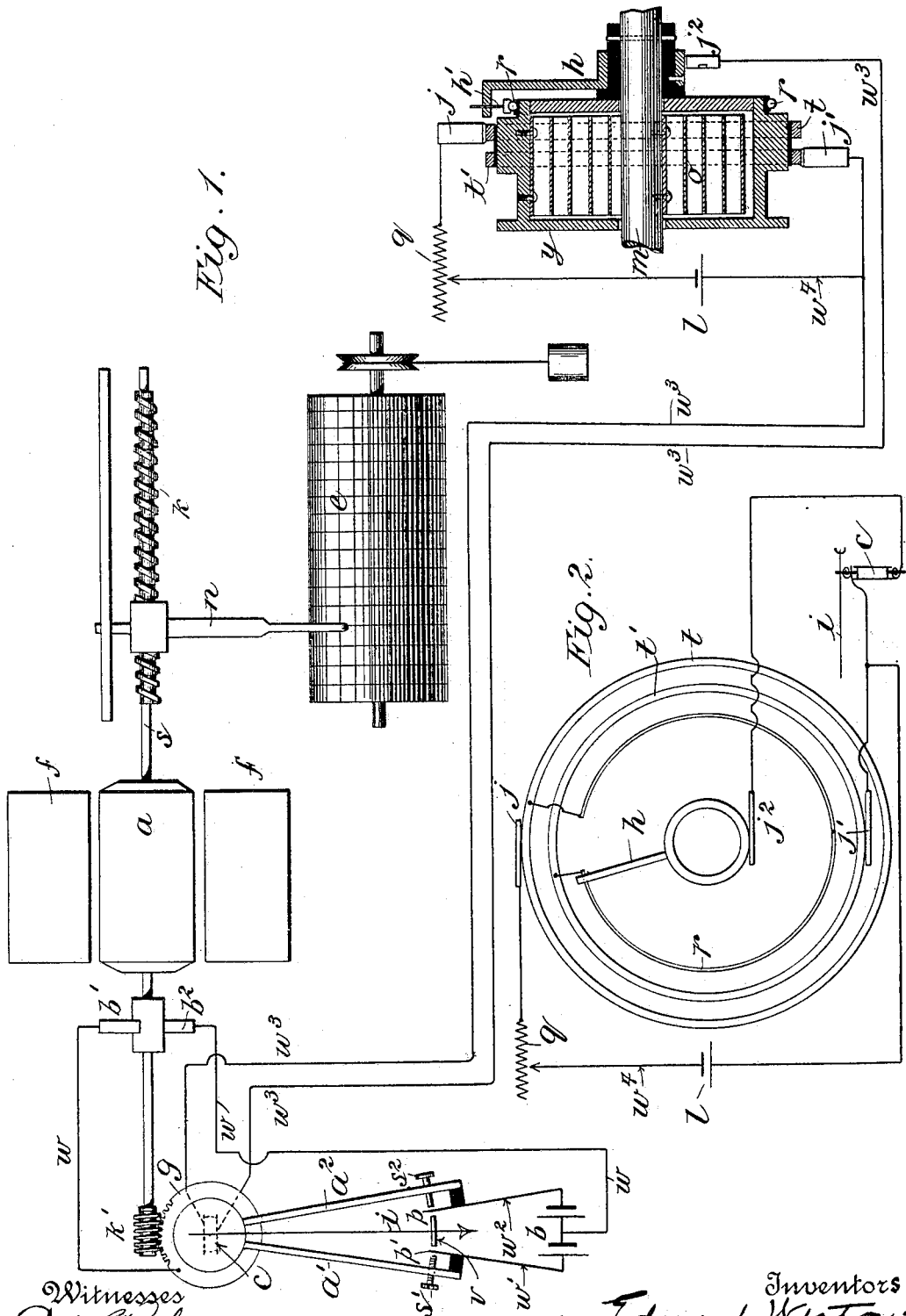

UNITED STATES PATENT OFFICE.

EDWARD WESTON, OF NEWARK, AND ADELBERT O. BENECKE, OF VAILSBURG, NEW JERSEY.

INDICATING OR RECORDING DYNAMOMETER.

SPECIFICATION forming part of Letters Patent No. 758,726, dated May 3, 1904.

Application filed May 31, 1902. Serial No. 109,598. (No model.)

*To all whom it may concern:*

Be it known that we, EDWARD WESTON, a subject of the King of Great Britain, residing at Newark, and ADELBERT O. BENECKE, a subject of the Emperor of Germany, residing at Vailsburg, in the county of Essex and State of New Jersey, have made a new and useful Invention in Indicating or Recording Dynamometers, of which the following is a specification.

Our invention has for its objects, first, to provide an indicating or recording dynamometer which will give accurate and instantaneous indications or records of all changes in the amount of energy absorbed by power-driven mechanism and of such a nature that the smallest changes may be correctly indicated or recorded; second, to make an accurate and permanent record of the amount of energy absorbed by power-driven mechanism and in such manner that said record shall be indicated upon a record sheet or surface having coördinate lines indicating, respectively, different units of coördinate values—as, for instance, fractions of hours and pounds of pressure; third, to provide an indicating or recording dynamometer which shall give an accurate indication or record of all changes in the amount of energy transmitted to or absorbed by power-driven mechanism and at a point more or less remote from such mechanism.

For a full and clear understanding of our invention, such as will enable others skilled in the art to construct and use the same, reference is had to the accompanying drawings, in which—

Figure 1 is a diagrammatic view illustrating the same, the dynamometer being shown in sectional view and attached to a part of a shaft of a power-driven mechanism. (Not shown.) Fig. 2 is a further diagrammatic view showing in detail the electrical circuit connections between the dynamometer and that portion of the instrument which controls the movements of the recording-stylus.

Referring first to Fig. 1, $i$ represents an index-needle attached to the movable coil $c$ of an instrument—such, for instance, as one of the well-known Weston electrical measuring instruments. $a$ represents a rotary armature, and $f\ f$ the field-magnets of an electromotive device having a shaft $s$ and worms or screws $k\ k'$ at its opposite ends, the worm $k$ being operatively connected through a nut or pin with an arm $n$, carrying a recording-stylus at its free end adapted to make a record upon a record surface or sheet carried by a time-driven cylinder $e$. $g$ is a worm-gear supporting two arms $a'\ a^2$ at one side and adjustable contacts $s'\ s^2\ p'\ p$ being yielding contacts insulated from the before-mentioned arms and connected by conductors $w'\ w^2$ to the opposite poles of a battery $b$. $w\ w$ are conductors running from the worm-gear $g$ and the middle of the battery $b$ to the commutator-brushes $b'\ b^2$. The armature-shaft $s$, being mechanically connected to the worms or screws $k\ k'$, is capable of imparting at the same time motion to the arm $n$, carrying the recording-stylus and to the worm-gear $g$, carrying the arms $a'\ a^2$. This part of the apparatus so far described is identically like that disclosed in a prior application for a patent for improvement in recording electrical measuring instruments, filed by us in the United States Patent Office on the 10th day of February, 1902, and bearing Serial No. 93,359, and is the preferred form of recording apparatus for effecting permanent records of the amount of energy transmitted to and absorbed by power-driven mechanism when combined with a dynamometer, as will now be described, the dynamometer being illustrated in sectional view at the lower right-hand side of Fig. 1.

$m$ represents a shaft of a power-absorbing mechanism, (not shown,) to which shaft is secured by screws, as shown, a strong spiral spring $o$, the outer end of said spring being secured in a similar manner to the inner surface of a power-driven pulley $y$.

$h$ is a conducting-arm integral with or secured to a metallic sleeve carried by an insulating-hub secured directly to the shaft $m$ and adapted to rotate therewith.

$h'$ is a yielding conducting-brush carried at the outer end of the arm $h$, its contacting end being adapted to bear upon a resistance $r$, secured directly to the pulley $y$. This resistance is connected at its opposite ends by conductors directly to two current-collecting rings $t$ $t'$, (see Fig. 2,) and $j$ $j'$ are current-collecting brushes resting thereon. $j^2$ is a third current-collecting brush resting directly upon the sleeve which carries the arm $h$.

$l$ is a battery located in a circuit $w^4$, and $q$ is a variable resistance for varying the potential relations of the circuit.

$w^3$ $w^3$ are conductors running, respectively, from the brushes $j'$ $j^2$ and one end of the conductor $w^4$ to the movable coil $c$, carrying the index-needle $i$, which controls the operation of the recording instrument.

It will be noted on inspection of Fig. 2 that there are two paths offered for the current from the battery $l$—one by way of the collecting-brush $j'$, collecting-ring $t'$, resistance $r$, collecting-ring $t$, collecting-brush $j$, resistance $q$ to the opposite pole of the battery; the other by way of the conductor $w^3$ through the coil $c$, which controls the operation of the indicator, brush $j^2$, arm $h$, resistance $r$, collecting-ring $t$, collecting-brush $j$, resistance $q$ to the negative pole of the battery.

The record-sheet to be placed upon the record-cylinder $e$ is ruled in the usual manner to indicate the coördinate results it is desired to permanently record—as, for instance, hours and fractions of hours in the direction of rotation of the cylinder $e$ and pounds and fractions of pounds in the direction of the movement of the stylus carried by the arm $n$.

The dynamometer illustrated in the present instance is composed of a strong spiral spring $o$ and pulley $y$ attached thereto. Said spring being attached to the shaft $m$, as before described, is tested by a Prony brake or otherwise, and its relative values in horse-power units or the like for different positions of the radial arm $h$ having been ascertained and the coördinate rulings of the record-sheet made to correspond therewith the apparatus is ready for use, and its operation is as follows:

The pulley $y$ is driven by a belt from a source of power, (not shown,) and under normal conditions when no power is being absorbed by the shaft $m$ let it be supposed that the arm $n$ and stylus carried thereby is in a position indicating "no pounds" pressure upon the record-sheet and that the record-cylinder $e$ is being rotated by a time-driven mechanism. Consequently the index-needle $i$ now stands in its central position, and the armature $a$ of the electromotive device is stationary. As power is applied to the pulley putting the spring $o$ under tension the same is absorbed by the shaft $m$. Consequently the arm $h$ and brush $h'$, carried thereby, rotate, say, from right to left, (see Fig. 2,) and as said arm and brush rotate the potential difference between the brushes $j'$ and $j^2$ is correspondingly increased, so that current from the battery $l$ by way of the conductor $w^3$ and through the coil $c$ is caused to flow in increased quantity and to therefore give to the index-needle $i$ movement, say, from right to left, thereby causing the arm $v$ to close the circuit between the contact-points $s'$ and $p'$ from the left-hand half of the battery $b$, by way of conductor $w'$, through the arm $a'$, worm-gear $g$, conductor $w$, commutator-brush $b'$, armature $a$, commutator-brush $b^2$, conductor $w$ in such direction as to cause the armature to rotate and move the arm $n$ from, say, left to right. This movement continues so long as power is being continuously applied to the pulley $y$ and until the maximum power is being absorbed, when the arm $h$ ceases to advance. As the shaft $s$ is continuously rotated, therefore, the worm-gear $g$ is rotated in such direction as to cause the arms $a'$ $a^2$ to follow the needle and to ultimately cause the circuit to be interrupted between the contact-points $p'$ and $s'$, thereby allowing the index-needle $i$ to assume a central position corresponding to that now shown. If the power being absorbed by the shaft $m$ remains constant at this point, the stylus at the end of the arm $n$ will make a continuous record in a line about the cylinder $e$. If there be any diminution of absorbed power by the shaft $m$, the arm $h$ will for obvious reasons move from left to right, thereby decreasing the potential difference between the brushes $j'$ and $j^2$ and causing a diminution of flow of current through the coil $c$, so that the index-needle $i$ is caused to rotate from left to right, the arm $v$ closing the circuit between the contact-points $p$ and $s^2$, thereby reversing the direction of rotation of the armature $a$, owing to the fact that the current flows from the right-hand half of the battery $b$ through the conductor $w$, commutator-brush $b^2$, armature $a$, commutator-brush $b'$, conductor $w$, worm-gear $g$, arm $a^2$, contact-points $s^2$ $p$, conductor $w^2$, to the negative pole, thus imparting to the arm $n$ a motion from right to left and giving upon the record-sheet an accurate record of the diminution of absorbed power.

It will be apparent, therefore, that with such an apparatus we are enabled to make a permanent record of all variations of absorbed power transmitted to the shaft $m$ and of the nature and duration thereof or of any variation of the transmitted power and duration of such variation.

We do not limit our invention to the especial details of construction shown in the accompanying drawings and hereinbefore described. We believe it is broadly new with us to devise an indicating or recording dynamometer in which the energy transmitted to and absorbed by a power-driven mechanism is accurately indicated or recorded as to duration and amount, and our claims are generic as to these features. We believe it is also broadly new with us to devise an indicating or recording dynamometer in which the record of the amount of energy absorbed by a power-driven mechanism may be correctly indicated or recorded, or both, at a point more or less remote from the power-driven mechanism, and our claims are generic as to this feature.

Although the structural apparatus disclosed in the accompanying drawings is for the purpose of recording the amount of energy transmitted to and absorbed by a power-driven mechanism, obviously the same may be adapted for the purpose of giving a visual indication of the same, and our claims hereinafter are designed to be of such scope as to include visual indicators as well as recorders when combined in the manner hereinbefore described.

Having thus described our invention, what we claim, and desire to secure by Letters Patent of the United States, is—

1. A dynamometer yieldingly connected to a power-absorbing machine; in combination with a time-driven recording instrument, a source of electrical energy and electrical connections between the dynamometer, the power-absorbing machine and the recording instrument, whereby a correct record is obtained as to the amount and duration of the energy absorbed, substantially as described.

2. A dynamometer yieldingly connected to a power-driven machine; in combination with a time-driven recording instrument electrically connected to the dynamometer and the machine, the record sheet or surface of the recording instrument being provided with coördinate record-lines for giving coördinate indications as to the amount of energy absorbed and the time or duration thereof, substantially as described.

3. A dynamometer having a yielding connection with a power-driven machine; in combination with a power-impelled recording instrument, electrical circuits and circuit connections between the two whereby the stylus of the power-driven recording instrument is caused to follow the variations of power applied to the dynamometer in accordance with the energy utilized by the power-driven mechanism and to make a permanent record thereof, substantially as described.

4. A dynamometer yieldingly connected to a power-driven machine; a time-driven recording instrument; in combination with a source of electrical energy and circuits and circuit connections whereby the stylus of the recording instrument will follow accurately the variations of the dynamometer and make an accurate permanent record thereof as to the amount of energy absorbed and the duration or time of the application thereof, substantially as described.

5. A dynamometer having a yielding connection with a power-driven machine; a time-driven recording instrument having a recording-stylus operatively connected to mechanism adapted to move it in opposite directions; in combination with a source of electrical energy and circuits and circuit connections between the dynamometer and the recording instrument, whereby the stylus is caused to accurately record all variations of transmitted or absorbed power, both as to the amount and duration thereof, substantially as described.

6. A dynamometer operatively connected to a power-driven machine and a recording instrument located at a point more or less remote therefrom; in combination with a source of electrical energy, circuits and circuit connections between the two, whereby a permanent record is made of the power transmitted or absorbed, substantially as described.

7. A dynamometer operatively connected to a power-driven machine; and a power-impelled recording instrument located at a point more or less remote therefrom; in combination with a motive device for the recorder, a source of electrical energy and circuits and circuit connections whereby the stylus of the recorder will follow accurately the variable movements of the dynamometer, substantially as described.

In testimony whereof we have signed our names to this specification in the presence of two subscribing witnesses.

EDWARD WESTON.
ADELBERT O. BENECKE.

Witnesses:
C. J. KINTNER,
W. H. YANGE.